United States Patent
Driscoll et al.

(10) Patent No.: US 8,224,978 B2
(45) Date of Patent: Jul. 17, 2012

(54) MECHANISM TO VERIFY PHYSICAL PROXIMITY

(75) Inventors: Daniel Driscoll, Bellevue, WA (US); Robert Hain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/436,947

(22) Filed: May 7, 2009

(65) Prior Publication Data
US 2010/0287288 A1   Nov. 11, 2010

(51) Int. Cl.
*G06F 15/16* (2006.01)
(52) U.S. Cl. ......... 709/229; 709/245; 709/224; 709/222
(58) Field of Classification Search .................. 709/229, 709/245, 224, 222
See application file for complete search history.

(56) References Cited

U.S. PATENT DOCUMENTS

| | | | |
|---|---|---|---|
| 7,129,891 B2 | 10/2006 | Meunier | |
| 2004/0181692 A1* | 9/2004 | Wild et al. | 713/201 |
| 2006/0248079 A1* | 11/2006 | Braica | 707/7 |
| 2008/0015855 A1* | 1/2008 | Suzuki | 704/230 |
| 2008/0037487 A1* | 2/2008 | Li et al. | 370/338 |
| 2008/0062940 A1 | 3/2008 | Othmer et al. | |
| 2008/0117864 A1 | 5/2008 | Wu et al. | |
| 2009/0083514 A1* | 3/2009 | Lee et al. | 711/221 |
| 2009/0327391 A1* | 12/2009 | Park et al. | 709/201 |
| 2010/0268692 A1* | 10/2010 | Resch | 707/687 |

OTHER PUBLICATIONS

Saroiu, Stefan, et al. "Enabling New Mobile Applications with Location Proofs." *HotMobile* 2009, Feb. 23-24, 2009, Santa Cruz, CA., <http://research.microsoft.com/en-us/um/people/alecw/hotmobile-2009.pdf>.

Varshavsky, Alex, et al. "Enabling Secure and Spontaneous Communication Between Mobile Devices Using Common Radio Environment." <http://www.seattle.intel-research.net/pubs/varshavsky_hotmobile2007.pdf>.

Scannell, Adin, et al. "Proximity-Based Authentication of Mobile Devices." *International Journal of Security and Networks*. Copyright 2009 Inderscience Enterprises Ltd., <http://www.cs.toronto.edu/~walex/papers/scannell2009proximity.pdf>.

Katranidou, Anastasia. "Location-Sensing Using the IEEE 802.11 Infrastructure and the Peer-to-Peer Paradigm for Mobile Computing Applications." Heraklion Feb. 20, 2006. Copyright 2006 University of Crete & ICS-FO.R.T.H. <http://ics.forth.gr/netlab/mobile/MasterThesis_katranid.pdf>.

Krumm, John, et al. "The NearMe Wireless Proximity Server." The Sixth International Conference on Ubiquitous Computing, pp. 283-300. Sep. 7-10, 2004. Nottingham, England. http://research.microsoft.com/en-us/um/people/kenh/papers/nearme.pdf.

Meunier, Jean-Luc. "Peer-to-Peer Determination of Proximity Using Wireless Network Data." Proceedings of the Second IEEE Annual Conference on Pervasive Computing and Communications Workshops. Copyright 2004 IEEE. http://ieeexplore.ieee.org/stamp/stamp.jsp?tp=&arnumber=1276908&isnumber=28557.

\* cited by examiner

*Primary Examiner* — Lan-Dai T Truong
(74) *Attorney, Agent, or Firm* — Capitol City TechLaw; Richard C. Irving

(57) ABSTRACT

Two participants may observe periodic data sources available only in the vicinity of physical trust (i.e. a wifi beacon). If an initial test of whether each participant has received the same key is passed, each party may hash the periodic source and communicate it to the other over a non-proximal communication channel (an IP network) and both are able to verify that the other (or agent of the other) is within the same vicinity.

20 Claims, 6 Drawing Sheets

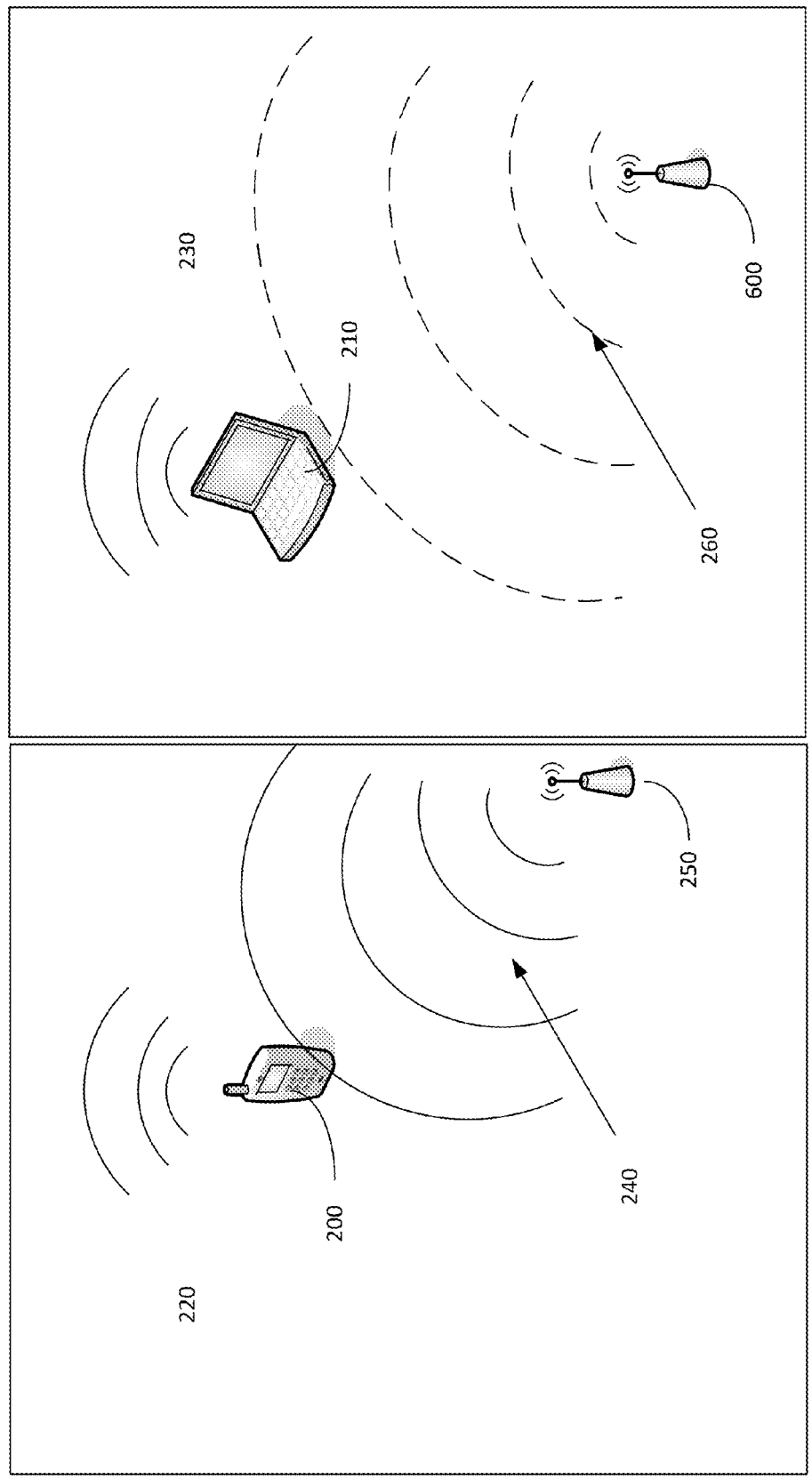

MECHANISM TO VERIFY PHYSICAL PROXIMITY

BACKGROUND

This Background is intended to provide the basic context of this patent application and it is not intended to describe a specific problem to be solved.

Two participants, such as a personal computer and a display device may be able to communicate over a channel that offers no physical proximity information (i.e., IP networking). There is no way to guarantee that the other party is physically proximal to the first party. The devices could be in the same room or across the world. In some cases, physical proximity is sufficient to guarantee a minimum (but not comprehensive) trust boundary. For example, it would be useful to limit access to an IP connected projector to a PC within range of a specific wifi beacon in the building.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and various embodiments are disclosed for using a non-direct channel to confirm that two computing devices are within the same vicinity. Two participants may observe periodic data sources available only in the vicinity of physical trust (i.e. a wifi beacon). If an initial, simple test is passed that each has observed the same key, each party may hash the periodic source and communicate it to the other over a non-proximal communication channel (an IP network) and both are able to verify that the other (or agent of the other) is within the same vicinity.

BRIEF DESCRIPTION OF THE DRAWINGS

FIG. 6 may illustrate two computing devices that are not in the same vicinity.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
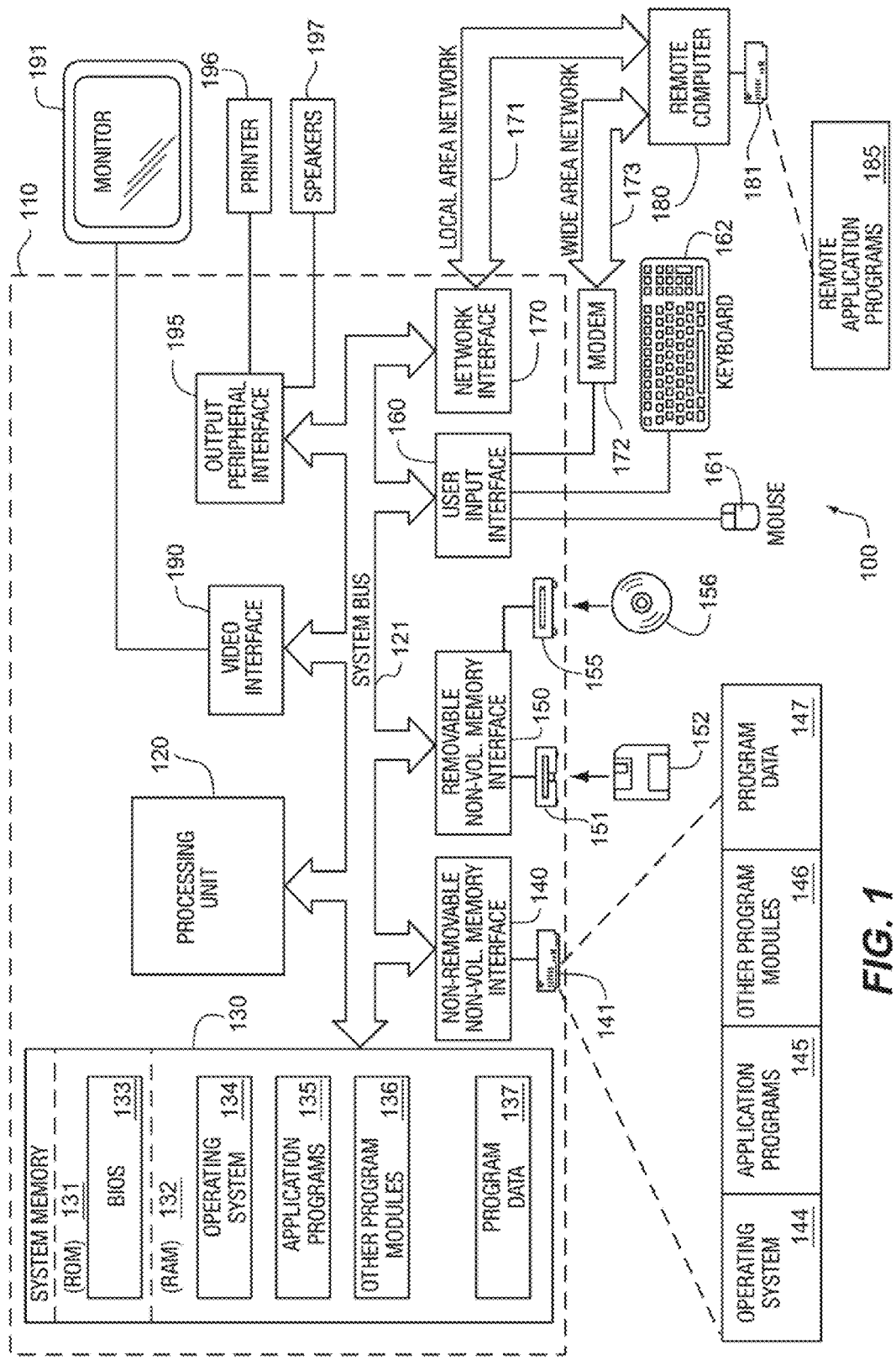
FIG. 1 is an illustration of a portable computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
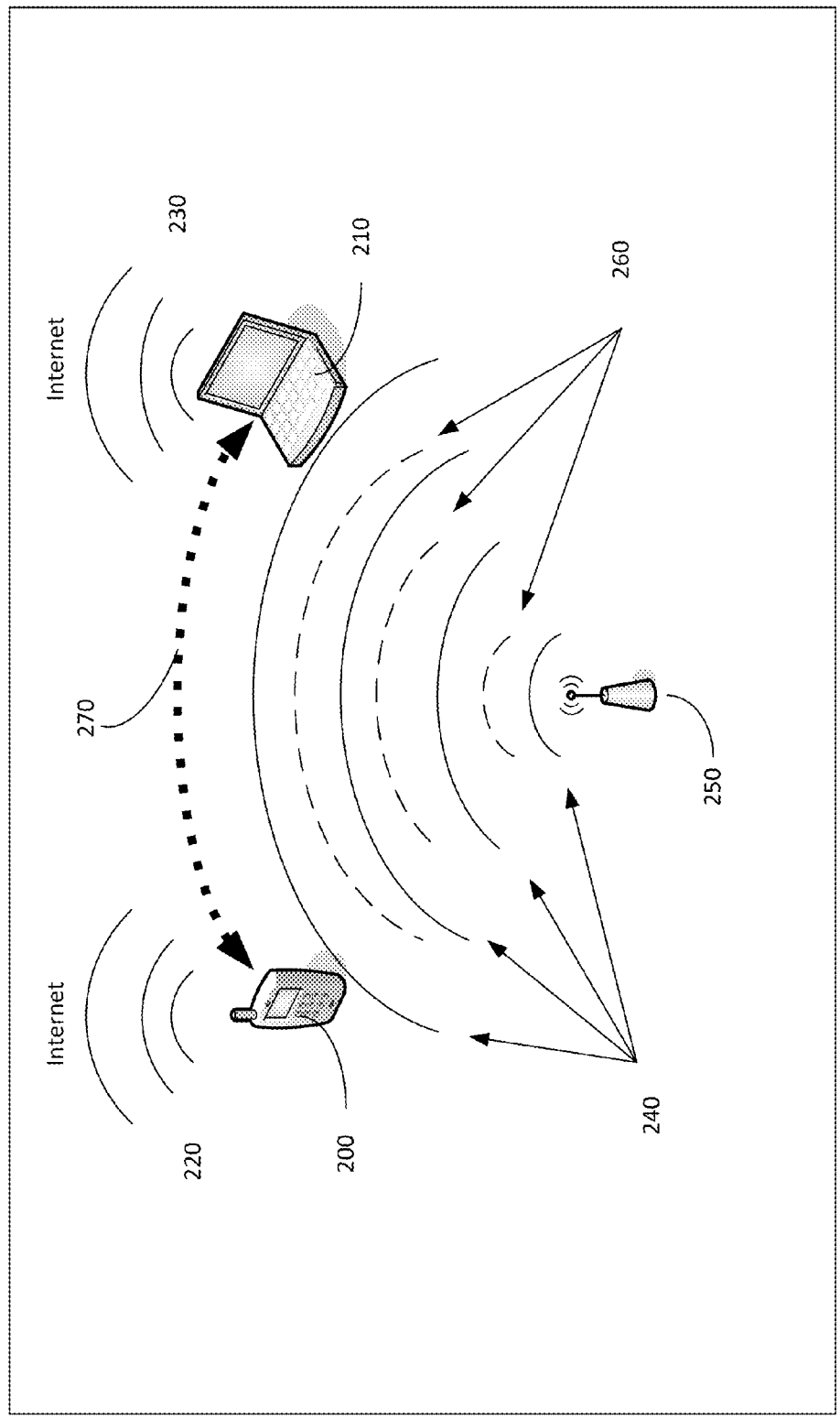
FIG. 2 is an illustration of two computing devices, a first computing device and a second computing device near a wifi source.

FIG. 2 is an illustration of two computing devices, a first computing device 200 and a second computing device 210 near a wifi source 250. Both may have processors and memories as described in FIG. 1. Often, it would be useful to verify that a first computing device 200 is within the vicinity of the second computing device 210. One way is to broadcast a first communication signal 220 from the first computing device 200 to the second computing device 210 (or a second communication signal 230 from the second computing device 210) and see if the signal is received by the non-sending device. However, the signal 220 or 230 may be intercepted or subject to malicious uses. Having a way to establish proximal trust independent of a communication channel would be helpful to establish trust.

One way to establish vicinity is to verify that both the first computing device 200 and the second computing device 210 are receiving a same separate signal 240, such as the beacon signal from a wifi access point 250. Other examples of the same separate signal 240 may be a strobe, an infrared signal, a sound signal, a visual signal, etc. The signal may be any signal that can be easily received. The signal may be a signal that does not travel over great distances. For example, if the first computing device 200 and second computing device 210 both receive the same AM radio station, they could still be separated by 500 miles. In addition, the signal should be distinguishable from background noise such that it may be clear that both parties are receiving the same separate signal 240.

Figure 3:
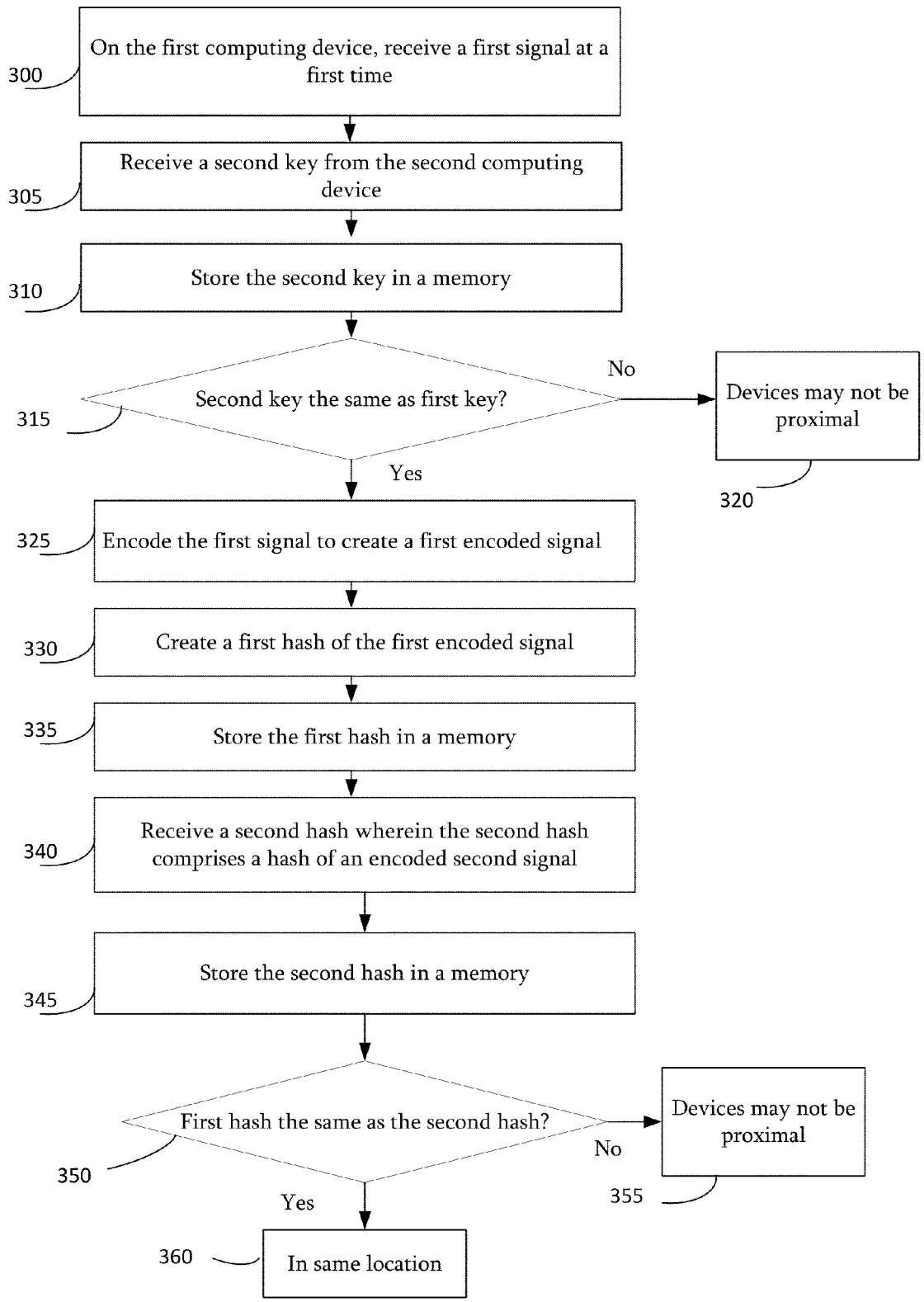
FIG. 3 is an illustration of a method of determining whether a first computing device and a second computing device are in the same vicinity as illustrated in FIG. 2.

FIG. 3 is an illustration of a method of determining whether a first computing device 200 and a second computing device 210 are in the same vicinity as illustrated in FIG. 2. As a result of the various embodiments of the method, two parties may be able to verify that the other can see the same common proximally relevant data source while the sequence is taking place. The parties do not have to actually communicate over this data source. The parties may be protected from denial of service attacks as the initiating party may be required to supply a key that changes slowly and may be easy to validate by the desired receiving party. The memory burden on both parties is limited as either a minimal amount of memory is used or a circular memory is used to cap the amount of memory.

At block 300, on the first computing device 200, a first signal 240 may be received at a first time. The first signal 240 may include a first key, which may contain an identifier of the source 250, among other pieces of information. At block 305, a second key may be received from the second computing device 210. The second key may be an identifier of the source 250 which may be observable by both the first computing device 200 and the second computing device 210. For example, if the wifi example, the second key may be the SSID of the wifi beacon which would be received by both the first computing device 200 and the second computing device 210 if they are in the same vicinity. The second key may or may not be subject to a hash function, such as the hash function described in block 330 and may be SHA-256, for example. The hash function may be useful to ensure trust but may be taxing on the processor and second computing device 210. At block 310, the second key may be stored in a memory, and the memory may be local on the first computing device 200 or remote, such as part of a peer-to-peer network or another network storage device.

At block 315, the second key may be compared to a first key. The first key may be similar to the second key, such as being an identifier of the source 250 which may be observable by both the first computing device 200 and the second computing device 210 at the same time. For example, if the wifi example, the key may be the SSID of the wifi beacon which may be received from the wifi source 250 by both the first computing device 200 and the second computing device 210 if they are in the same vicinity at the same time. The first key may be subject to a hash function, such as the hash function described in block 330 and may be SHA-256, for example.

At block 320, if the second key is not the same as the first key, the method may end as the first computing device 200 and second computing device 210 must not be in the same vicinity as the first key received at the first computing device 200 is different than the second key received at the second computing device 210. FIG. 6 may be an illustration of a situation where the first key may be different than the second key. In FIG. 6, there may be two different wifi stations, a first 250 and a second 600. The wifi station may be close, such as at different gates at an airport, but may be separated by enough distance that the first computing device 200 and second computing device 210 may be considered to be in different locations. Logically, the beacon likely will be different for the first 250 and second wifi 600 station and, also logic dictates that the first key would be different than the second key. In another embodiment, the method may begin again at block 300.

At block 315, if the second key is the same as the first key, an initial guess may be made that the first computing device 200 and second computing device 210 are in the same vicinity. This may be communicated to a user as a report or as a pop-up. As a result of the guess being that the first computing device 200 and second computing device 210 are in the same vicinity, it makes sense to exert the effort (processing time, memory usage, power usage, etc.) to continue to examine whether the devices 200 and 210 are in the same vicinity.

At block 325, the first signal 250 may be encoded to create a first encoded signal. The encoding may employ any logically appropriate encoding scheme. For example, the encoding may quantitize the first signal into a quantizited first signal and the encoding function may translate the quantizited first signal. If the first signal is a wifi beacon signal, for example, the encoding may be a serialization of the wifi beacon signal by any well known serialization techniques.

At block 330, a first hash of the first encoded signal may be created. Hash functions are well known. In one embodiment, a one way hash may be used. A sample hash function may be SHA-256.

At block 335, the first hash may be stored in a memory. The memory may be part of the first computing device 200 or may be remotely in communication with the first computing device 200.

At block 340, a second hash may be received. The second hash may be created on the second computing device 210. The second hash may be a hash of an encoded second signal 260 where the second signal may be a second signal 260 received on the second computing device 210 at a second time that has been encoded using an encoding function, such as the encoding function described in block 305.

The second signal 260 may simply be an unknown signal. In some cases, such as when the first computing device 200 and second computing device 210 are in the same vicinity, the first signal 240 may be the same as the second signal 260 because the same signal may be received at both the first computing device 200 and the second computing device 210. In actuality, the second signal 260 may be the first signal 240 and the first signal 240 and second signal 260 may be received at different times. As a result, subsequent frames of the periodic signal may indicate that the first signal 240 and second signal 260 are the same but were received at different times. Iteration, such as described in FIG. 4, may indicate that the first signal 240 and second signal 260 are the same.

It should be noted that in some embodiments, the second hash is received over a non-direct communication channel. For example, it is likely the first computing device 200 could communicate directly to the second computing device 210, such as using a direct channel 270 such as an infrared signal, a wireless signal, etc. In non-direct communication, the second hash is communicated to a network such as the Internet and then the back to the second computing device 210. However, by using a second channel, spoof and denial of service attacks may occur.

At block 345, the second hash from block 340 may be stored in a memory. The memory may be local on the first computing device 200 or may be remotely accessed.

To further verify that the first computing device 200 and second computing device 210 are in the same vicinity, at block 350, the first hash (from block 310) and the second hash (block 325) may be compared. If the first hash and second hash are determined to be the same, it may be concluded that the first computing device 200 and the second computing device 210 are in proximity of a same signal wherein the same signal comprises at least one of the first signal 240 and the second signal 260. The proximity determination may be communicated in many forms, such as an email, a text message, a display, a ringtone, etc.

Figure 4:
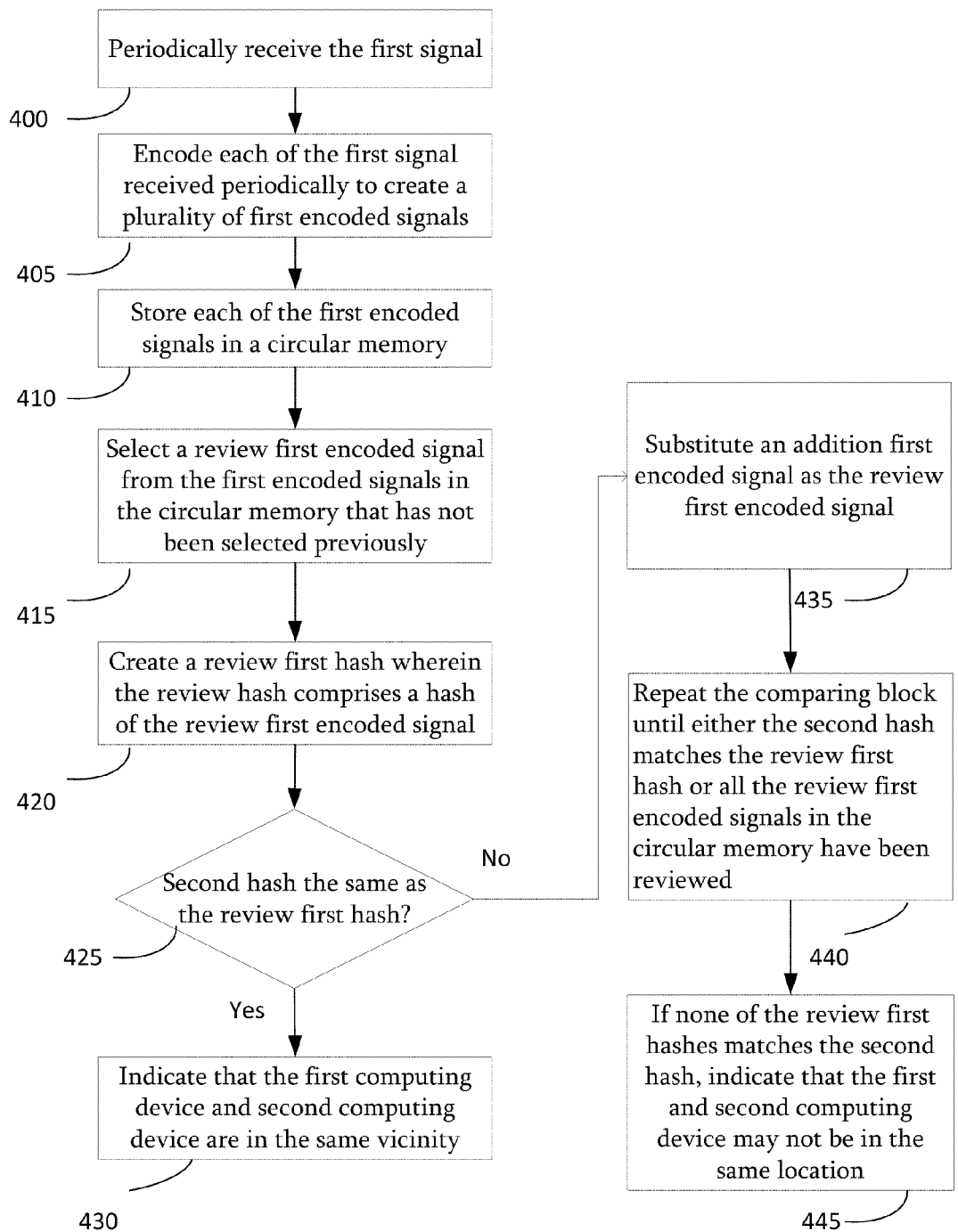
FIG. 4 is an illustration of a further embodiment that adds a circular memory and periodic observations and comparison of the first and second signal.

In another embodiment, a different type of validation may occur. Referring to FIG. 4, at block 400, on the first computing device, may periodically receive the first signal 240. For example, the first signal 240 may be sampled every 200 ms. By sampling, time difference of the first signal 240 or second signal 260 reaching the first computing device 200 and the second computing device 210 may be accounted for. For example, the first computing device 200 and second computing device 210 may be in the same room but the room may be large and full of interference. The first signal 240 likely should be received by the first computing device 200 and second computing device 210, but due to processing delays, distance and interference, the exact same signal may not be reached at both the first computing device 200 and second computing device 210. By taking and storing a sample, interference and distance may be taken into account to verify that the same signal really is being received by the first computing device 200 and the second computing device 210.

At block 405, each of the first signals received periodically may be encoded to create a plurality of first encoded signals. The encoding may be the same as described in block 325 or may be a higher speed encoding in order to handle the additional signals. At block 410, each of the first encoded signals may be stored in a circular memory. The circular memory is a traditional circular memory where new data is put in at the beginning of the memory and later data may be moved out of the circular memory. Of course, other memory devices are possible such as arrays or traditional memories.

At block 415, a review first encoded signal may be selected. The selection may involve selecting one of the first encoded signals in the circular memory that has not been selected previously. In one embodiment, the method may move sequentially through the stored first encoded signals. In other embodiment, the first time when the first signal was received and the second time the signal was received may be compared to better determine the starting point in the circular memory. In another embodiment, the selection may be random. Of course, other embodiments are possible and are contemplated.

At block 420, a review first hash may be created where the review hash maybe a hash of the review first encoded signal. Similar to FIG. 3, the hash may be any appropriate hash so long as the hash selected is used across all the computing devices 200 210.

At block 425, the second hash and the first hash are compared. The comparison may be to see if the hashes are the same which would indicate the same signal was received at the first computing device 200 and the second computing device 210 and that they are in the same vicinity. At block 430, if the second hash matches the review first hash, it may be indicated that the first computing device and second computing device are in the same vicinity as they have received the same signal.

At block 435, if the second hash does not match the review first hash, an addition first encoded signal may be substituted as the review first encoded signal, and, at block 440, the comparing block may be repeated until either the second hash matches the review first has or all the review first encoded signals in the circular memory have been reviewed. In this way, the entire circular memory will be reviewed and if a match is found, the match will be indicated. If a match is not found between the review first hashes and the second hash, it may be indicated that the first and second computing device are not in the same vicinity.

An advantage to using multiple selections is that the first signal 240 or second signal 260 does not have to be received at the exact same time at the first computing device 200 and the second computing device 210. By reviewing a plurality of signals received at a plurality of times, the issue of processing delays, interference and distance may be mitigated.

Figure 5:
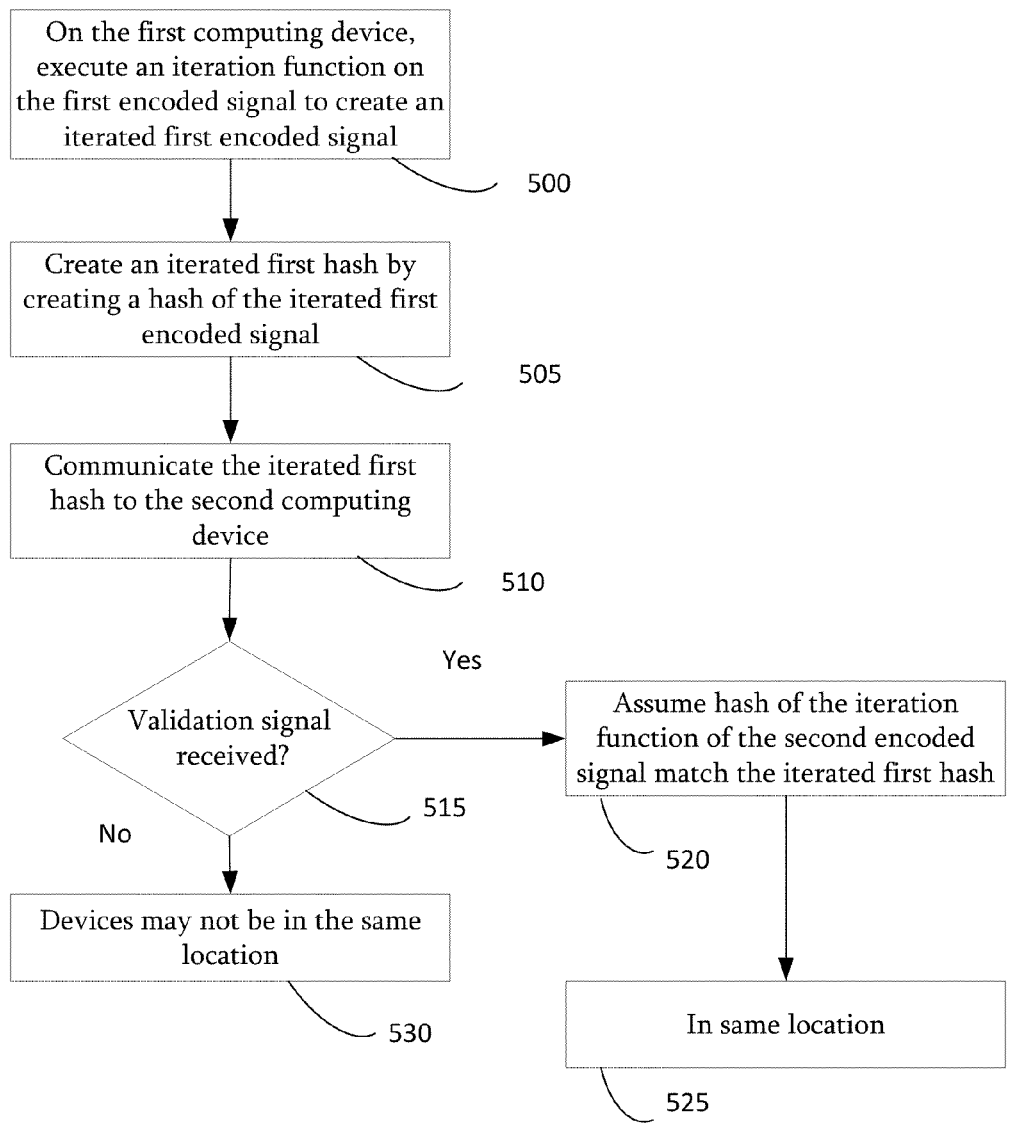
FIG. 5 may illustrate a further embodiment that adds an iteration function.

FIG. 5 may illustrate a further embodiment that adds an iteration function. At block 500, on the first computing device, an iteration function may be executed on the first encoded signal to create an iterated first encoded signal. The iteration function could be virtually any iteration function. In one embodiment, the iteration function merely selects the next signal in the sequence of un-hashed signals. In another embodiment, the iteration function concatenates "new" and the encoded signal. Of course, other embodiments are possible and are contemplated. The iteration function may be known by both the first device 200 and the second device 210 and the same iteration function likely should be used at each device 200 210.

At block 505, an iterated first hash may be created where the hash is created by taking a hash of the iterated first encoded signal. The hash may be similar to the hash described previously. At block 510 the iterated first hash may be communicated to the second computing device 210. Again, the communication may be on a non-direct communication channel.

At block 515, it may be determined if a validation signal is received from the second computing device. The validation signal may be created at the second computing device 210 if a hash of the iteration function of the second encoded signal matched the iterated first hash. If the validation signal is received, at block 520, assume that the hash of the iteration function of the second encoded signal matched the iterated first hash. As the hashes matched, it can safely be announced at block 525 that the computing devices 200 210 are in the same location. If the validation signal is not received, at block 530 it may be announced that the first computing device 200 and second computing device 210 are not in the same location. Of course, in FIG. 2, 3, 4 or 5, the first computing device 200 and second computing devices 210 may be switched and the method may be repeated.

As a result of the various embodiments of the method, two parties may be able to verify that the other can see the same common proximally relevant data source while the sequence is taking place. The parties do not have to actually communicate over this data source. The parties may be protected from denial of service attacks as the initiating party may be required to supply a key that changes slowly and may be easy to validate by the desired receiving party. The memory burden on both parties is limited as either a minimal amount of memory is used or a circular memory is used to cap the amount of memory.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A method of determining whether a first computing device and a second computing device are in the same vicinity comprising:
   on the first computing device,
      receiving a first signal from a first beacon source at a first time, the first signal including a first key which further includes an identifier of the first beacon source;
      receiving a second key from the second computing device, the second key including an identifier of a second beacon source that is different from the second computing device, the second beacon source being observable to computing devices in a vicinity of the second beacon source;
      storing the second key in a memory;
      comparing the second key to the first key;
      if the second key is not the same as the first key, ending the method;
      if the second key is the same as the first key,
         periodically receiving the first signal;
         encoding each of the first signals received periodically using an encoding function to create a plurality of first encoded signals;
         storing each of the plurality of first encoded signals in a circular memory;
         selecting a review first encoded signal comprising selecting one of the first encoded signals in the circular memory that has not been selected previously;
         creating a review first hash wherein the review first hash comprises a hash of the review first encoded signal;
         storing the review first hash in a memory;
         receiving a second hash from the second computing device, wherein the second hash comprises a hash of an encoded second signal wherein the encoded second signal comprises a second signal received on the second computing device at a second time that has been encoded;
         storing the second hash in a memory;
         comparing the review first hash to the second hash;
         if the second hash matches the review first hash, indicating that the first computing device and the second computing device are in the same vicinity;
         if the second hash does not match the review first hash,
            substituting an addition first encoded signal as the review first encoded signal, and
            repeating the second comparing block until either the second hash matches the review first hash or all the review first encoded signals in the circular memory have been reviewed;
         if none of the review first hashes matches the second hash, indicating that the first computing device and the second computing device may not be in the same vicinity.

2. The method of claim 1, further comprising:
   on the first computing device, executing an iteration function on one of the first encoded signals to create an iterated first encoded signal;
   creating an iterated first hash comprising creating a hash of the iterated first encoded signal;
   communicating the iterated first hash to the second computing device;
   receiving from the second computing device a validation signal if a hash of the iteration function of a second encoded signal matched the iterated first hash wherein the second encoded signal is the second signal after being encoded;
   if the validation signal is not received, determining that the first computing device and the second computing device are not in the same location.

3. The method of claim 2, further comprising switching the first computing device and the second computing device and repeating the method.

4. The method of claim 2, wherein the first key and the second key represent a source identifier of the first signal or the second signal.

5. The method of claim 4, wherein the first key comprises a hash of the source identifier of the signal at the first computing device and the second key comprises a hash of the source identifier of the signal at the second computing device.

6. The method of claim 5, wherein the source identifier is a SSID of a wifi beacon.

7. The method of claim 6, wherein the encoding function creates a serialization of the wifi beacon.

8. The method of claim 2, wherein the iteration function is known by both the first computing device and the second computing device.

9. The method of claim 2, wherein the hash comprises a one way hash function and is used by both the first computing device and the second computing device.

10. The method of claim 2, wherein communication occurs over a non-proximal communication channel.

11. The method of claim 1, further comprising quantizing the first signal into a quantitized first signal and quantizing the second signal into a quantitized second signal.

12. The method of claim 11 wherein the encoding function translates the quantitized first signal and the quantitized second signal into a first string and a second string.

13. The method of claim 1, wherein the second signal is an unknown signal.

14. The method of claim 1, wherein the first beacon source and the second beacon source are wifi beacons.

15. A computer storage memory comprising computer executable instructions for physically transforming a processor to perform a method of determining whether a first computing device and a second computing device are in the same vicinity, the method comprising:
 on the first computing device:
  receiving a first signal from a first beacon source at a first time, the first signal including a first key which further includes an identifier of the first beacon source;
  receiving a second key from the second computing device, the second key including an identifier of a second beacon source that is different from the second computing device, the second beacon source being observable to computing devices in a vicinity of the second beacon source;
  storing the second key in a memory;
  comparing the second key to the first key;
  if the second key is not the same as the first key, ending the method;
  if the second key is the same as the first key,
   periodically receiving the first signal;
   encoding each of the first signals received periodically using an encoding function to create a plurality of first encoded signals;
   storing each of the plurality of first encoded signals in a circular memory;
   selecting a review first encoded signal comprising selecting one of the first encoded signals in the circular memory that has not been selected previously;
   creating a review first hash wherein the review first hash comprises a hash of the review first encoded signal;
   storing the review first hash in a memory;
   receiving a second hash from the second computing device, wherein the second hash comprises a hash of an encoded second signal wherein the encoded second signal comprises a second signal received on the second computing device at a second time that has been encoded wherein the second signal is an unknown signal;
   storing the second hash in a memory;
   comparing the second hash to the review first hash;
   if the second hash matches the review first hash indicating that the first computing device and the second computing device are in the same vicinity;
   if the second hash does not match the review first hash,
    substituting an addition first encoded signal as the review first encoded signal, and
    repeating the second comparing block until either the second hash matches the review first hash or all the review first encoded signals in the circular memory have been reviewed; and
    if none of the review first hashes matches the second hash, indicating that the first computing device and the second computing device may not be in the same vicinity.

16. The computer storage memory of claim 15, wherein the method further comprising:
 on the first computing device, executing an iteration function on one of the first encoded signals to create an iterated first encoded signal;
 creating an iterated first hash comprising creating a hash of the iterated first encoded signal;
 communicating the iterated first hash to the second computing device;
 receiving from the second computing device a validation signal if a hash of the iteration function of a second encoded signal matched the iterated first hash wherein the second encoded signal is the second signal after being encoded; and
 if the validation signal is not received, determining that the first computing device and the second computing device may not be in the same location.

17. The computer storage memory of claim 15, wherein the hashes are SHA-256 hash functions.

18. A computer system comprising:
 a processor;
 a memory; and
 an input/and output circuit;
 wherein the processor is configured to perform a method comprising:
  on the first computing device:
   receiving a first signal from a first beacon source at a first time, the first signal including a first key which further includes an identifier of the first beacon source;
   receiving a second key from the second computing device, the second key including an identifier of a second beacon source that is different from the second computing device, the second beacon source being observable to computing devices in a vicinity of the second beacon source, the first key and the second key representing a source identifier of the first signal or a second signal wherein the second signal is an unknown signal;
   storing the second key in a memory;
   comparing the second key to the first key;
   if the second key is not the same as the first key, ending the method;
   if the second key is the same as the first key,
    periodically receiving the first signal;
    encoding each of the first signals received periodically using an encoding function to create a plurality of first encoded signals wherein the encoding function translates a quantitized first signal and a quantitized second signal into a first string and a second string;
    storing each of the first encoded signals in a circular memory;
    selecting a review first encoded signal comprising selecting one of the first encoded signals in the circular memory that has not been selected previously;
    creating a review first hash wherein the review first hash comprises a hash of the review first encoded signal;
    receiving a second hash from the second computing device, wherein the second hash comprises a hash of an encoded second signal wherein the encoded second signal comprises the second signal received on the second computing device at a second time that has been encoded;
    storing the second hash in a memory;
    comparing the second hash to the review first hash;
    if the second hash matches the review first hash, indicating that the first computing device and the second computing device are in the same vicinity;
    if the second hash does not match the review first hash,
     substituting an addition first encoded signal as the review first encoded signal, and
     repeating the second comparing block until either the second hash matches the review first hash or all the review first encoded signals in the circular memory have been reviewed; and if none of the review first hashes matches the second hash, indicating that the first computing device and the second computing device may not be in the same vicinity.

19. The computer system of claim 18, wherein method further comprises:
on the first computing device, executing an iteration function on one of the first encoded signals to create an iterated first encoded signal;
creating an iterated first hash comprising creating a hash of the iterated first encoded signal;
communicating the iterated first hash to the second computing device;

receiving from the second computing device a validation signal if a hash of the iteration function of a second encoded signal matched the iterated first hash wherein the second encoded signal is the second signal after being encoded; and
if the validation signal is not received, determining that the first computing device and the second computing device are not in the same location.

20. The computer system of claim 18, wherein the hashes are SHA-256 hash functions and the first beacon source and the second beacon source are wifi beacons.

* * * * *